United States Patent
Cai et al.

(10) Patent No.: US 10,171,559 B2
(45) Date of Patent: Jan. 1, 2019

(54) VXLAN SECURITY IMPLEMENTED USING VXLAN MEMBERSHIP INFORMATION AT VTEPS

(71) Applicant: Cisco Technology, Inc., San Jose, CA (US)

(72) Inventors: Feng Cai, Shanghai (CN); Yuxiang Chen, Shanghai (CN); Danmu Wu, Shanghai (CN); Zhiyong Fang, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 589 days.

(21) Appl. No.: 14/549,915

(22) Filed: Nov. 21, 2014

(65) Prior Publication Data

US 2016/0149808 A1    May 26, 2016

(51) Int. Cl.
*H04L 29/08* (2006.01)
*H04L 12/46* (2006.01)

(52) U.S. Cl.
CPC .......... *H04L 67/10* (2013.01); *H04L 12/4633* (2013.01)

(58) Field of Classification Search
CPC ... H04L 69/324; H04L 12/46; H04L 12/4633; H04L 12/4641; H04L 29/06829; H04L 45/00; H04L 45/586; H04L 45/64; H04L 47/825; H04L 49/354; H04L 63/00; H04L 63/0236; H04L 63/0272; H04L 63/029;
(Continued)

(56) References Cited

U.S. PATENT DOCUMENTS

| 9,106,508 B2 * | 8/2015 | Banavalikar | H04L 45/00 |
| 2009/0037607 A1 * | 2/2009 | Farinacci | H04L 12/4641 |
| | | | 709/249 |

(Continued)

FOREIGN PATENT DOCUMENTS

| WO | WO2013101453 | * | 7/2013 | |
| WO | WO 2013101453 A1 * | 7/2013 | ............. H04L 41/12 |

OTHER PUBLICATIONS

D. Cai and S. Natarajan, "The Evolution of the Carrier Cloud Networking," 2013 IEEE Seventh International Symposium on Service-Oriented System Engineering, Redwood City, 2013, pp. 286-291. doi: 10.1109/SOSE.2013.43.*

(Continued)

*Primary Examiner* — Andrew Lai
*Assistant Examiner* — Hoyet H Andrews, III
(74) *Attorney, Agent, or Firm* — Edell, Shapiro & Finnan, LLC (57) ABSTRACT

A network device stores a Virtual Extensible Local Area Network (VxLAN) Tunnel Endpoint (VTEP) membership information that associates VxLANs each with a corresponding set of VTEPs authorized to originate VxLAN packets on that VxLAN. The network device receives from a communication network a VxLAN packet that identifies a VxLAN and an originating VTEP. The VTEP compares the originating VTEP to the set of VTEPs associated with the VxLAN in the VTEP membership information that matches the identified VxLAN. If the comparison indicates that the originating VTEP is not included in the set of VTEPs authorized to originate VxLAN packets, the VTEP discards the received VxLAN packet. Otherwise the VTEP further processes the VxLAN packet.

18 Claims, 8 Drawing Sheets

(58) Field of Classification Search
CPC ... H04L 63/0428; H04L 63/101; H04L 63/14; H04L 45/74; H04L 29/06; H04L 49/70; H04L 67/10
See application file for complete search history.

(56) References Cited

U.S. PATENT DOCUMENTS

| | | | | |
|---|---|---|---|---|
| 2012/0176934 | A1* | 7/2012 | Farinacci | H04L 12/4641 370/254 |
| 2013/0124750 | A1* | 5/2013 | Anumala | H04L 12/4625 709/232 |
| 2013/0170490 | A1* | 7/2013 | Kreeger | H04L 41/12 370/390 |
| 2013/0266015 | A1* | 10/2013 | Qu | H04L 45/74 370/392 |
| 2013/0266019 | A1* | 10/2013 | Qu | H04L 45/74 370/395.53 |
| 2013/0287022 | A1* | 10/2013 | Banavalikar | H04L 45/00 370/389 |
| 2013/0318219 | A1* | 11/2013 | Kancherla | H04L 49/70 709/222 |
| 2013/0322453 | A1* | 12/2013 | Allan | H04L 12/4662 370/395.53 |

OTHER PUBLICATIONS

Omar Sultan et al., titled "Digging Deeper into VxLAN Part 1" (DIGDEEP hereinafter) was presented as Cisco Blog under the technology regarding Data Center, and was published Sep. 29, 2011.*

Omar Sultan et al., titled "Digging Deeper into VxLAN Part 1" (DIGDEEP hereinafter) was presented as Cisco Blog under the technology regarding Data Center, and was published Sep. 29, 2011; hereafter, Sultan teaches discloses in DIGDEEP, "cover the basics—why VXLANs and what is VXLAN".*

Mahalingam et al., titled "VXLAN: A Framework for Overlaying Virtualized Layer 2 Networks over Layer 3 Networks" (Mahalingam hereinafter) was presented as Network Working Group Internet Draft, published Oct. 16, 2013.*

RFC6833, titled "Locator/ID Separation Protocol (LISP) Map-Server Interface" (RFC6833 hereinafter) was presented as Internet Engineering Task Force (IETF), Request for Comments: 6833, Category: Experimental published Jan. 2013.*

WHITEPAPER2013, titled "Data Center Overlay Technologies" (WHITEPAPER2013 hereinafter) was presented by CISCO, published Oct. 2013.*

D. Cai and S. Natarajan (Cai hereinafter), "The Evolution of the Carrier Cloud Networking," 2013 IEEE Seventh International Symposium on Service-Oriented System Engineering, Redwood City, 2013, pp. 286-291; doi: 10.1109/SOSE.2013.43.*

Arista, "VXLAN: Scaling Data Center Capacity," White Paper, Aug. 2012, 7 pages.

Cassar, et al., "LISP RLOC Membership Distribution," Internet Engineering Task Force (IETF), Network Working Group, Internet-Draft, Sep. 22, 2014, 16 pages.

Cisco, "VXLAN Overview: Cisco Nexus 9000 Series Switches," White Paper, Nov. 2013, 10 pages.

* cited by examiner

VXLAN SECURITY IMPLEMENTED USING VXLAN MEMBERSHIP INFORMATION AT VTEPS

TECHNICAL FIELD

The present disclosure relates to network security.

BACKGROUND

Cloud-based data centers may use Virtual Extensible Local Area Networks (VxLANs) to extend L2 networks across L3 networks. VxLAN Tunnel Endpoints (VTEPs) encapsulate Ethernet frames from local endpoint systems served by the VTEPs to form VxLAN-encapsulated packets (herein "VxLAN packets"). The VTEPs tunnel the VxLAN-encapsulated packets to peer VTEPs across an Internet Protocol (IP)-based network, such as the Internet.

Network attackers may inject malicious VxLAN packets into the network targeting the VTEPs. The VTEPs are not equipped to detect the malicious VxLAN packets and, therefore, process the packets as if they were valid. This may cause network congestion and other deleterious effects both at the VTEPs and the endpoint systems.

DESCRIPTION OF EXAMPLE EMBODIMENTS

Overview

A network device configured as a Virtual Extensible Local Area Network (VxLAN) Tunnel Endpoint (VTEP) stores VTEP membership information that associates VxLANs each with a corresponding set of VTEPs authorized to originate VxLAN packets on that VxLAN. The VTEP receives from a communication network a VxLAN packet that identifies a VxLAN and an originating VTEP. The VTEP compares the originating VTEP to the set of VTEPs associated with the VxLAN in the VTEP membership information that matches the identified VxLAN. If the comparison indicates that the originating VTEP is not included in the set of VTEPs authorized to originate VxLAN packets, the VTEP discards the received VxLAN packet. If the comparison indicates that the originating VTEP is included, the VTEP performs further processing of the VxLAN packet.

Example Embodiments

Virtual Extensible Local Area Network (VxLAN) is a framework defined in Internet Engineering Task Force (IETF) RFC 7348 (the "VxLAN IETF") for overlaying virtualized Layer 2 (L2) networks onto Layer 3 (L3) networks, to allow L2 adjacency across the L3 networks. Cloud-based virtualized data centers may use VxLAN techniques to overlay L2 network onto L3 networks within and across the data centers. Using VxLAN, virtual machines (VMs) operating in disparate L2 networks in the data centers may communicate across L3 networks as if the VMs were in the same L2 domain. Each VxLAN overlay is referred to as a VxLAN segment and identified by a unique 24-bit segment identifier called a VxLAN identifier (ID) (VNI). Virtual machines (VMs) on the same VNI but in different data centers may communicate with each other. To this end, the VxLAN overlay carries L2/Ethernet traffic between the VMs over an L3 network in an encapsulated format that incorporates the appropriate VNI to define a logical "VxLAN tunnel." The VxLAN tunnel terminates with network devices referred to as VxLAN Tunnel Endpoints (VTEPs) that encapsulate and decapsulate the Ethernet traffic between the VMs.

Figure 1:
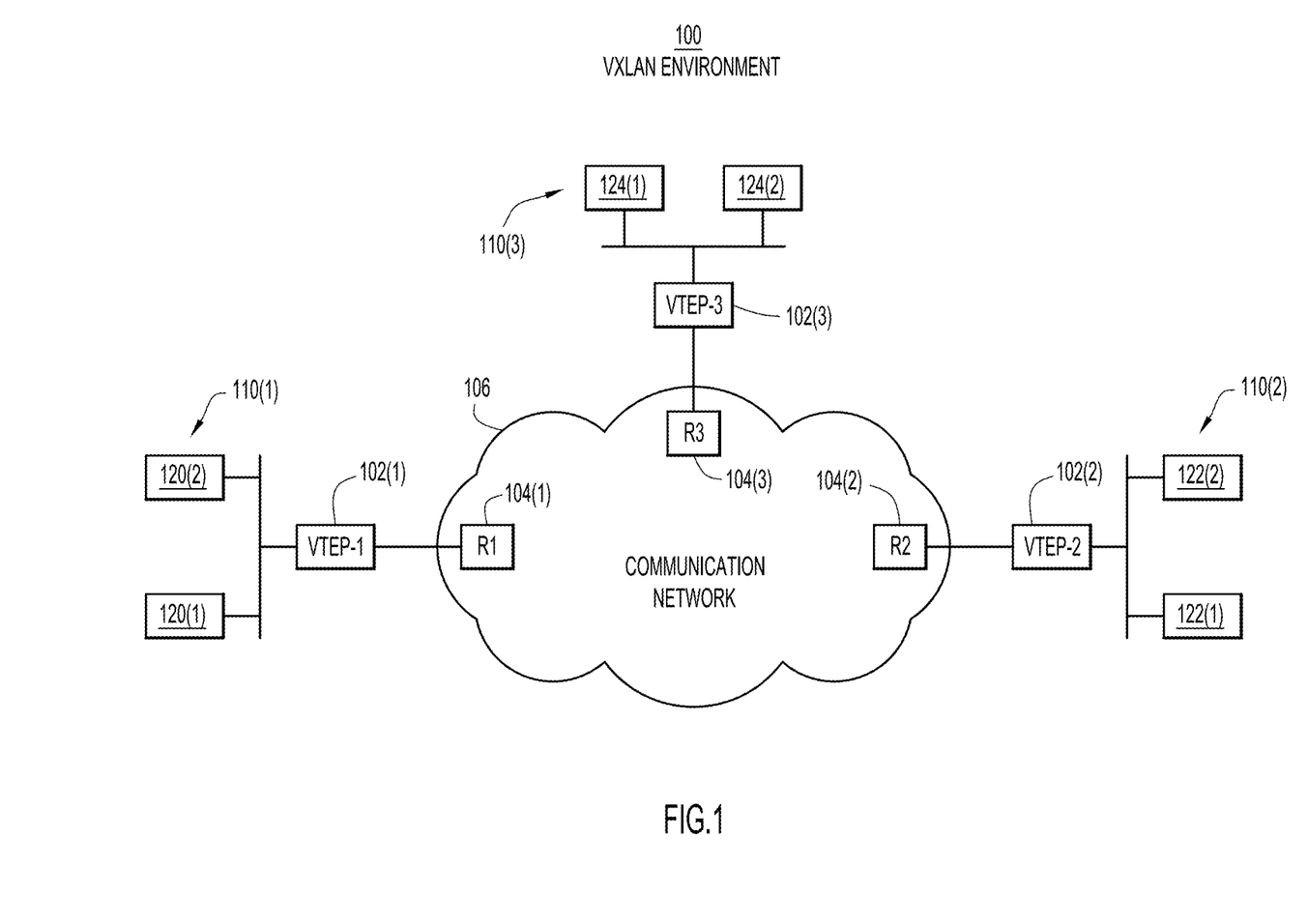
FIG. 1 illustrates a network environment in which Virtual Extensible Local Area Network (VxLAN) techniques may be implemented, according to an example embodiment.

With reference to FIG. 1 there is shown an example network environment 100 in which VxLAN techniques are implemented. Network environment 100 includes VTEPs 102(1)-102(3) (also referred to as VTEP-1-VTEP-3, respectively) each connected to a communication network 106 through respective routers 104(1)-104(3) (also referred to as routers R1-R3). Communication network 106 includes one or more wide area networks (WANs), such as the Internet, and may include one or more local area networks (LANs). VTEPs 102(1)-102(3) are also connected to respective LANs 110(1)-110(3). LANs 110(1), 110(2), and 110(3) include respective sets of endpoint systems 120(1) and 120(2), 122(1) and 122(2), and 124(1) and 124(2). Each endpoint system (e.g., endpoint system 120(1)) may be a server that hosts one or more virtual machines (VMs). Each VTEP, generically referred to by reference numeral 102(i), and the respective LAN, generically referred to by reference numeral 110(i), may be part of a distinct cloud-based data center. Network environment 100 is just an example; more VTEPs and more or less LANs and associated endpoint systems may be present.

At a high level, endpoint systems 120(1)/120(2), 122(1)/122(2), and 124(1)/124(2) operate on the same VxLANs, i.e., on the same VNIs, and communicate with each other over communication network 106 through corresponding VTEPs 102(1), 102(2), and 102(3). For example, endpoint system 120(1) operating on a VxLAN identified as VNI 10 sends an Ethernet frame destined for endpoint system 122(1) also operating on that VNI to local VTEP 102(1). VTEP 102(1) encapsulates the Ethernet frame with a VxLAN encapsulation including VNI 10, and forwards the resulting encapsulated Ethernet packet as a VxLAN-encapsulated packet (VxLAN packet) to VTEP 100(2) over network 106 via routers 104(1) and 104(2). VTEP 102(2) receives the VxLAN packet and decapsulates the VxLAN encapsulation to recover the original Ethernet frame therein from endpoint system 120(1). VTEP 102(2) forwards the Ethernet frame to local endpoint device 122(1).

Figure 2:
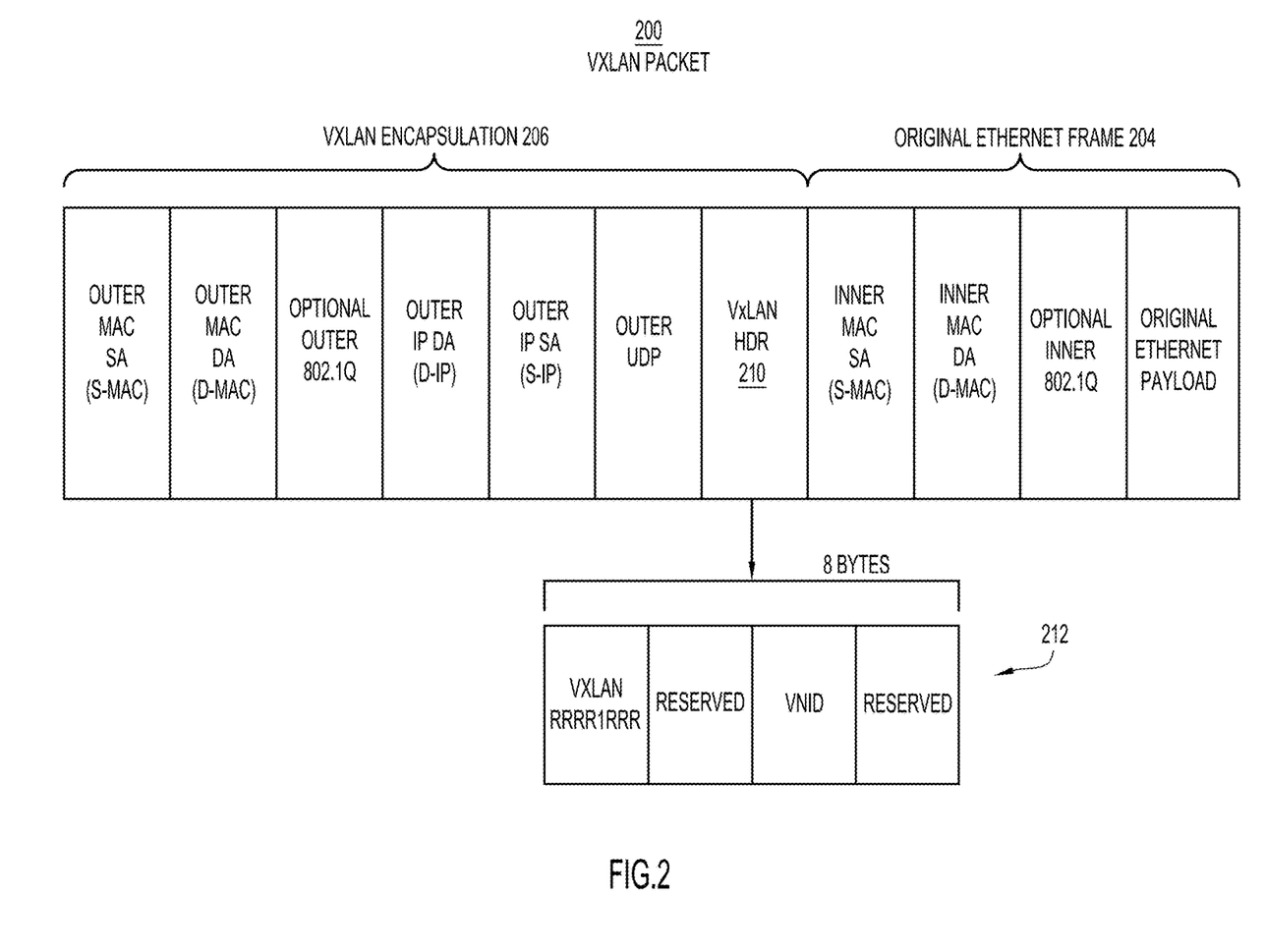
FIG. 2 is an illustration of an example VxLAN packet, according to an example embodiment.

With reference to FIG. 2, there is an illustration of an example VxLAN packet 200 formatted according to the VxLAN IETF-prescribed format. VxLAN packet 200 includes an inner or original Ethernet frame/packet 204 encapsulated by an outer VxLAN encapsulation header 206. In the high level example of FIG. 1, endpoint system 120(1) originates Ethernet frame/packet 204 and VTEP 102(1) encapsulates the Ethernet frame/packet with VxLAN encapsulation 206.

Ethernet frame 204 includes an original Ethernet payload (i.e., data), an optional inner IEEE 802.1Q field, an inner Media Access Control (MAC) destination address (DA) D-MAC, and an inner MAC source address (SA) S-MAC. In the example of FIG. 1, the S-MAC and D-MAC are the respective MAC addresses of endpoint systems 120(1) and 122(1).

VxLAN encapsulation 206 is a User Datagram Protocol (UDP)/Internet Protocol (IP)/MAC (or Ethernet) encapsulation. Specifically, VxLAN encapsulation 206 includes a VXLAN header 210 (shown in expanded view at 212), an outer UDP header, an outer IP SA S-IP (i.e., an IP address of an originating or source VTEP, e.g., VTEP 102(1)), an outer IP DA D-IP (i.e., an IP address of a target VTEP, e.g., VTEP 102(2)), an optional outer 802.1Q field, an outer MAC DA D-MAC, an outer MAC SA S-MAC, and a checksum field (now shown in FIG. 2). The outer D-MAC and S-MAC addresses are used for next hop (or hop-by-hop) routing of VxLAN packet 200 from the originating VTEP to the target VTEP through network 106. VXLAN header 210 includes a 24-bit VxLAN ID (VNI), two reserved fields, and a field referred to as "VXLAN RRRR1RRR."

General VxLAN techniques will be described below in connection with FIGS. 3 and 4. Then, VxLAN security techniques based on VxLAN membership information will be described in connection with FIGS. 5-8.

Figure 3:
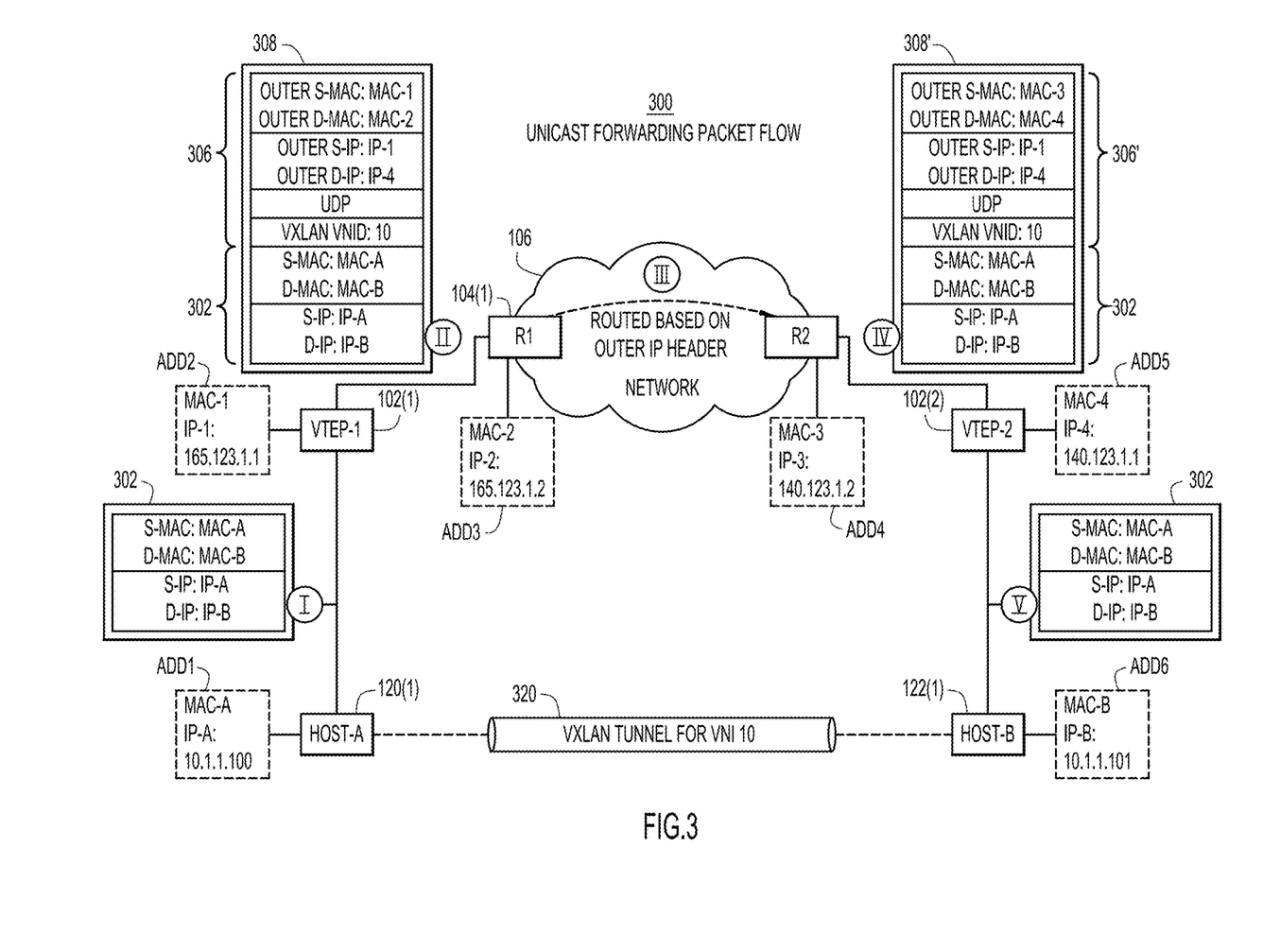
FIG. 3 is an illustration of a unicast VxLAN forwarding packet flow between VxLAN Tunnel Endpoints (VTEPs), according to an example embodiment.

With reference to FIG. 3, there is an illustration of a unicast VxLAN forwarding packet flow 300 between VTEP 102(1) and VTEP 102(2) used to transfer an Ethernet packet from endpoint system 120(1) (referred to as Host A) to endpoint system 122(1) (referred to as Host B). The example of FIG. 3 expands on the example transfer from VTEP 102(1) to VTEP 102(2) described at a high level in connection with FIG. 1. As depicted in FIG. 3, endpoint systems 120(1) and 122(1), VTEPs 102(1) and 102(2), and routers 104(1) and 104(2) have respective example pairs of MAC and IP addresses ADD1-ADD6.

Moving left-to-right in FIG. 3, at a first transaction denoted by Roman numeral I, endpoint system 120(1) transmits Ethernet frame/packet 302 destined for endpoint system 122(1) to VTEP 102(1). Ethernet frame 302 includes S-MAC and D-MAC addresses MAC-A and MAC-B, respectively, and S-IP and D-IP addresses IP-A and IP-B, respectively, for originating and target endpoint systems 120(1) and 122(1), respectively. Both of endpoint devices 120(1) and 122(1) operate on the VxLAN identified as VNI 10 on which VTEP 102(1) is configured to participate. VTEP 102(1) receives Ethernet frame 302 and encapsulates the Ethernet frame with VxLAN encapsulation 306 to produce VxLAN packet 308, in which the encapsulated Ethernet frame is now an "inner" frame. VxLAN encapsulation 306 includes VNI 10, a UDP header, and outer S-IP and D-IP addresses IP-1 and IP-2 of originating VTEP 102(1) and target VTEP 102(2), respectively. VxLAN encapsulation 306 also includes outer S-MAC and D-MAC addresses MAC-1 and MAC-2 of VTEP 120(1) and next hop router 104(1).

At a second transaction II, VTEP 102(1) forwards VxLAN packet 308 to router 104(1).

At a third transaction III, router 104(1) forwards VxLAN packet 308 across network 106 to router 104(2).

At a fourth transaction IV, router 104(2) forwards a VxLAN packet 308' to VTEP 102(2). VxLAN packet 308' is the same as VxLAN packet 308, except that the outer S-MAC and D-MAC addresses in a VxLAN encapsulation 306' of VxLAN packet 308' are different from the outer MAC addresses in VxLAN encapsulation 306 of VxLAN packet 308 to account for the next hop between router 104(2) and VTEP 102(2). VTEP 102(2) decapsulates VxLAN packet 308' to recover original Ethernet frame 302 therein.

At a fifth transaction V, VTEP 102(2) forwards recovered Ethernet frame 302 to target endpoint device 122(1) based on the D-MAC address MAC-B in the Ethernet frame. Each of VTEPs 102 maintains a dynamic MAC table that lists MAC addresses of endpoint systems known to be connected locally to the VTEPs. If the D-MAC address MAC-B in Ethernet frame 302 is known to VTEP 102(2) through the MAC table in the VTEP, then the VTEP forwards the Ethernet frame to endpoint system 122(1) according to mapping entries in the MAC table. Otherwise, VTEP 102(2) floods Ethernet frame to LAN 110(2), and updates the MAC table based on responses to the flooding from endpoint systems in the LAN.

In the aforementioned example, VTEPs 102(1) and 102(2) form a VxLAN tunnel 320 identified by VNI 10 (depicted at the bottom of FIG. 3).

Figure 4:
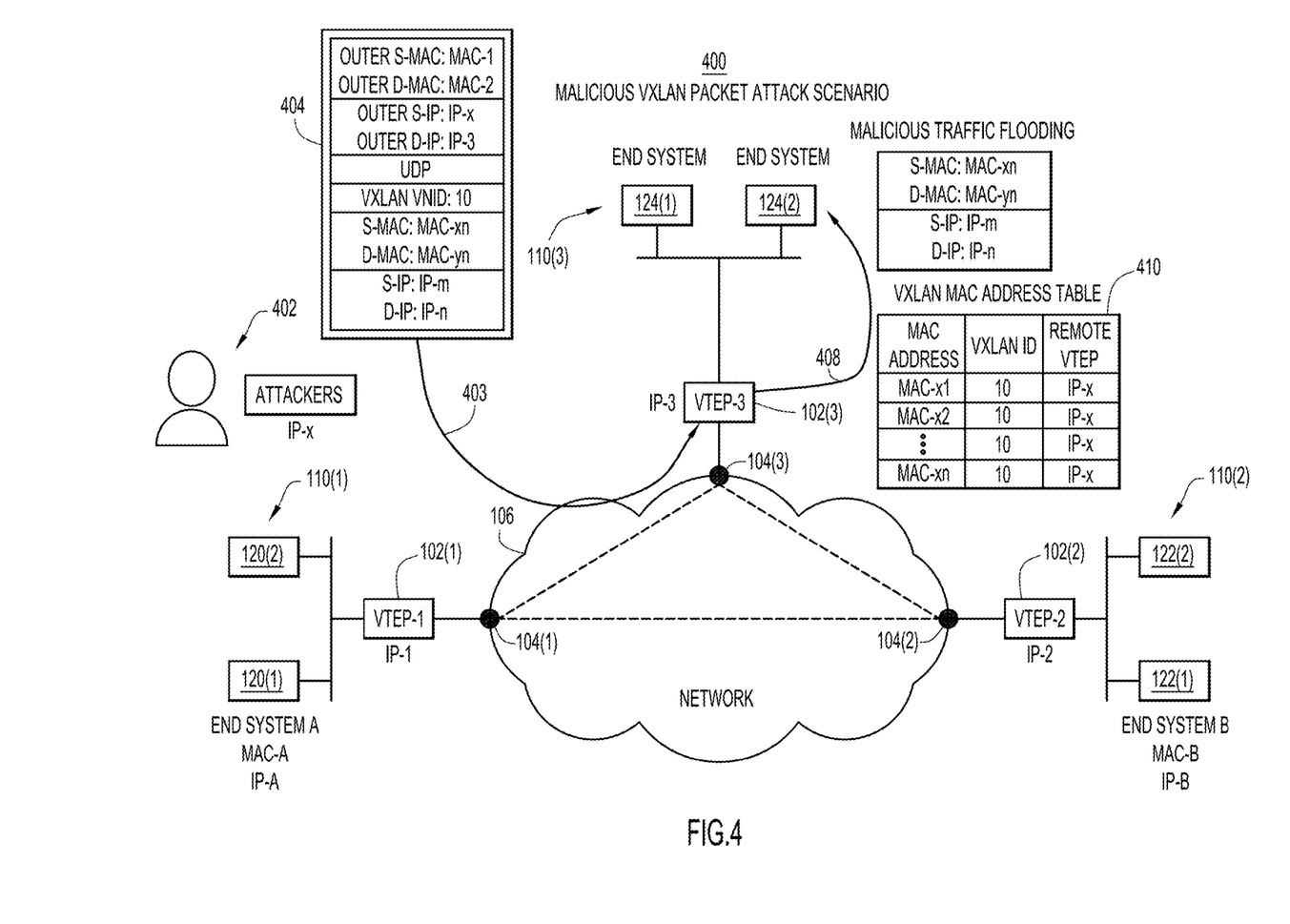
FIG. 4 illustrates a first malicious VxLAN packet attack targeting VTEPs that are not configured to detect the attack, according to an example embodiment.

With reference to FIG. 4, there is shown a first example malicious VxLAN packet attack 400 that targets VTEP 102(3) in network environment 100 that is not configured to detect the attack. In the example of FIG. 4, VTEP 102(3) has an IP address IP-3 and is configured to participate on VxLAN with VNI 10. To initiate the attack, an attacker 402, such as an external application hosted on a computer joined to network 106, constructs a malicious VxLAN packet 404 and at 403 injects the malicious VxLAN packet into network 106. Malicious VxLAN packet 404 includes false entries, such as inner S-MAC and D-MAC addresses MAC-xn and MAC-yn (where n may be any integer number), a VNI 10 (which happens to be configured on VTEP 102(3)), outer S-IP and D-IP addresses IP-x and IP-3 (where D-IP address IP-3 happens to be the IP address of VTEP 102(3)), and outer S-MAC and D-MAC addresses MAC-1 and MAC-2. From the perspective of attacker 402, malicious VxLAN packet 404 fortuitously identifies a valid VNI (e.g., VNI 10) and a valid target VTEP (e.g., VTEP 102(3)), even though outer S-IP address IP-x (i.e., the IP address of the originating VTEP), is not valid.

Network 106 routes malicious VxLAN packet 404 to VTEP 102(3) because the malicious VxLAN packet and the VTEP share the same target VTEP IP address (e.g., outer D-IP =IP 3). VTEP 102(3) receives malicious VxLAN packet 404 and fails to recognize the packet as invalid because the VTEP 102(3) recognizes valid VNI 10 in the packet, and is not equipped to recognize that originating VTEP IP address IP-x is not valid for VNI 10. Accordingly, VTEP 102(3) processes malicious VxLAN packet 404 as if it were a valid VxLAN packet. VTEP 102(3) decapsulates VxLAN packet 404 to recover the original Ethernet frame therein. The D-MAC address MAC-yn of an endpoint system as specified in malicious VxLAN packet 404 may not be known to VTEP 102(3) because the MAC address MAC-yn may not be listed in the MAC table of the VTEP. As a result, at 408, VTEP 102(3) floods the recovered Ethernet frame on LAN 110(3), and receives responses from the endpoint systems on the LAN. An example MAC address table 410 in VTEP 102(3) is depicted in FIG. 4. Table 410 reflects numerous updates made to that table by VTEP 102(3) as a result of VxLAN packet 404, e.g., additional entries for S-MAC addresses MAC-x1-MAC-xn, and outer S-IP address IP-x (i.e., the invalid source VTEP IP address).

Figure 5:
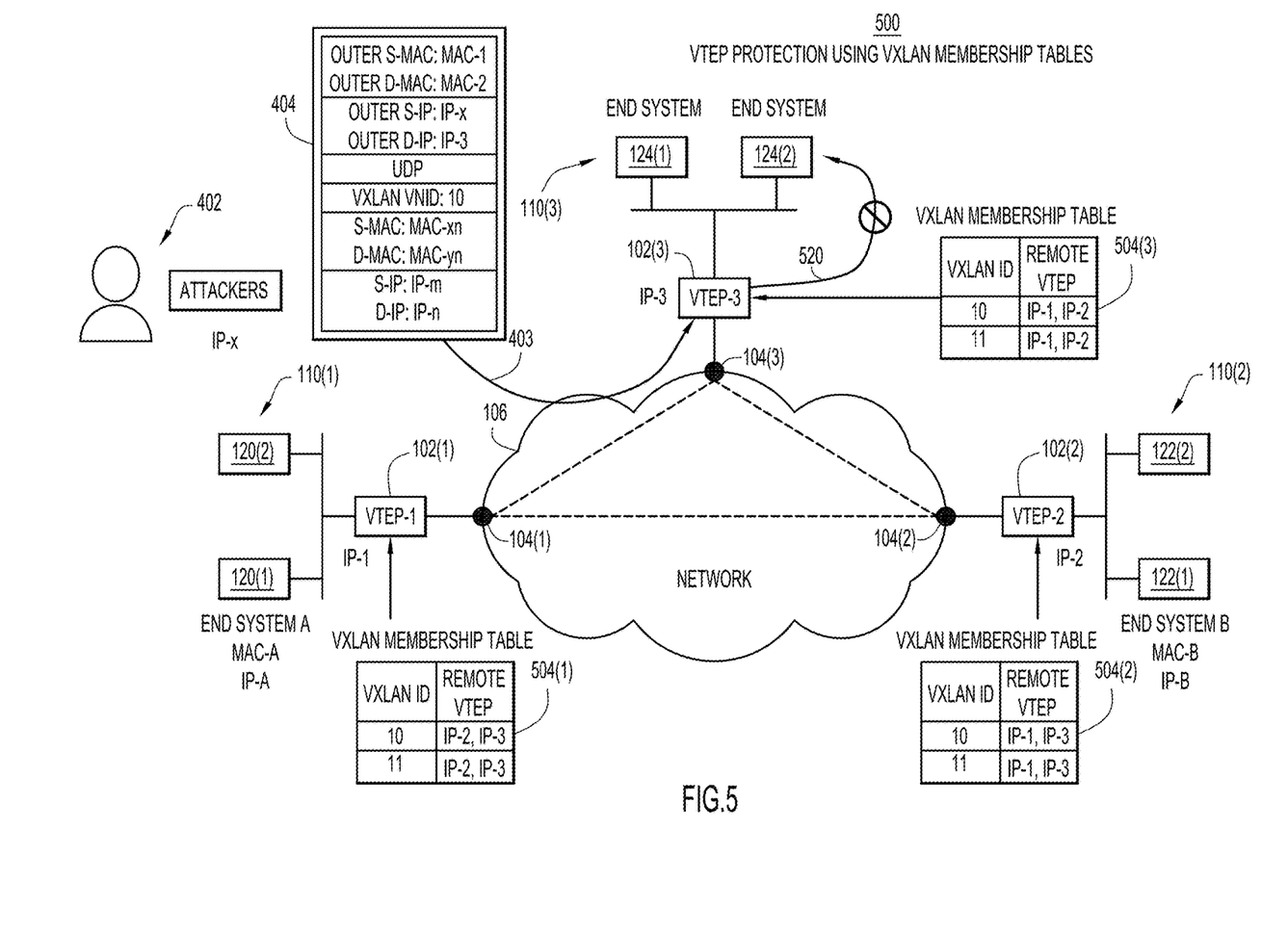
FIG. 5 illustrates a second malicious VxLAN packet attack targeting VTEPs that are configured to detect the attack, according to an example embodiment.

With reference to FIG. 5, there is shown a second example malicious VxLAN packet attack 500 that targets VTEPs 102. Unlike in the example of FIG. 4, VTEPs 102 in the example of FIG. 5 each perform a VxLAN security technique based on a local VxLAN membership table to detect whether a malicious VxLAN packet have been received, as will be described below.

Each of VTEPs 102(1), 102(2), and 102(3) creates and stores in memory VxLAN membership information 504(1), 504(2), and 504(3), respectively. The VxLAN membership information 504(1), 504(2), and 504(3) (also referred to generally in the ensuing description as VxLAN membership tables 504(1), 504(2), and 504(3)) may be stored in any suitable form, such as in a table, a list, or a tree structure, and may be merged with other databases stored in the corresponding one of VTEPS 102. Each VxLAN membership table 504(i) lists one or more VNIs configured on corresponding VTEP 102(i) (i.e., the VTEP on which the table is stored) and a set of one or more authorized or valid originating/remote VTEP identifiers (referred to as "Remote VTEP" in FIG. 5) associated with each of the one or more VNIs. The VTEP identifiers are the IP addresses of VTEPs authorized to originate VxLAN packets on the given VNI.

In the example of FIG. 5, VxLAN membership table 504(1) for VTEP 102(1) lists VNIs 10 and 11. VNI 10 and VNI 11 are each associated with VTEP IP addresses IP-2 and IP-3. Thus, from the perspective of VTEP 102(1), VTEP 102(2) and VTEP 102(3) are both authorized to originate VxLAN packets on VNI 10 or VNI 11. Similarly, VxLAN membership table 504(2) for VTEP 102(2) also lists VNIs 10 and 11. VNI 10 and VNI 11 are each associated with VTEP IP addresses IP-1 and IP-3. Thus, from the perspective of VTEP 102(2), VTEP 102(1) and VTEP 102(3) are both authorized to originate VxLAN packets with VNI 10 or VNI 11. Finally, VxLAN membership table 504(3) for VTEP 102(3) also lists VNIs 10 and 11. VNI 10 and VNI 11 are each associated with VTEP IP addresses IP-1 and IP-2. Thus, from the perspective of VTEP 102(3), VTEP 102(1) and VTEP 102(2) are both authorized to originate VxLAN packets with VNI 10 or VNI 11.

Similar to the first example attack scenario described above in connection with FIG. 4, at 403, in FIG. 5, attacker 402 injects malicious VxLAN packet 404 into network 106. VxLAN packet 404 specifies VNI 10 and outer S-IP address (i.e., the originating VTEP IP address) IP-x. Network 106 routes VxLAN packet 404 to VTEP 102(3). VTEP 102(3) receives VxLAN packet 404 and determines whether the received VxLAN packet is valid, i.e., was sent from a valid/authorized VTEP based on VxLAN membership table 504(3). To do this, VTEP 102(3) (i) uses the VNI in VxLAN packet 404 (e.g., VNI 10) as an index into VxLAN membership table 504(3) to access the list of authorized originating VTEP IP addresses for that VNI, and (ii) compares the outer S-IP address in the VxLAN packet (e.g., IP-x) against the accessed list of authorized originating VTEP IP addresses (e.g., IP addresses IP-1 and IP-2).

Generally, if the compare indicates that the outer S-IP address in VxLAN packet 404 is included in the list of authorized originating VTEP IP addresses from VxLAN membership table 504(3), VTEP 102(3) continues to process VxLAN packet 404 as described above, i.e., decapsulates the packet and forwards the original Ethernet frame recovered therefrom to the appropriate local endpoint system. If the compare indicates otherwise, i.e., that the outer S-IP address is not in the list of authorized originating VTEP IP addresses, VTEP 102(3) recognizes VxLAN packet 404 as being invalid and discards the packet. In the example, the compare indicates that outer S-IP address IP-x is not in the list of authorized originating VTEP IP addresses IP-1 and IP-2 and, therefore, VTEP 102(3) discards VxLAN packet 404. In this case, flooding of Ethernet frames to local endpoint systems is blocked, as indicated at blocked arrow 520.

As described above, each VxLAN membership table 504(i) acts as a VxLAN data plane source filter that the corresponding VTEP 102(i) uses to verify/validate the source VTEP IP address S-IP in received VxLAN packets before the VTEP decapsulates the packet. In other words, each VTEP 102(i) filters received VxLAN packets based on the entries in VxLAN membership table 504(i).

Figure 6:
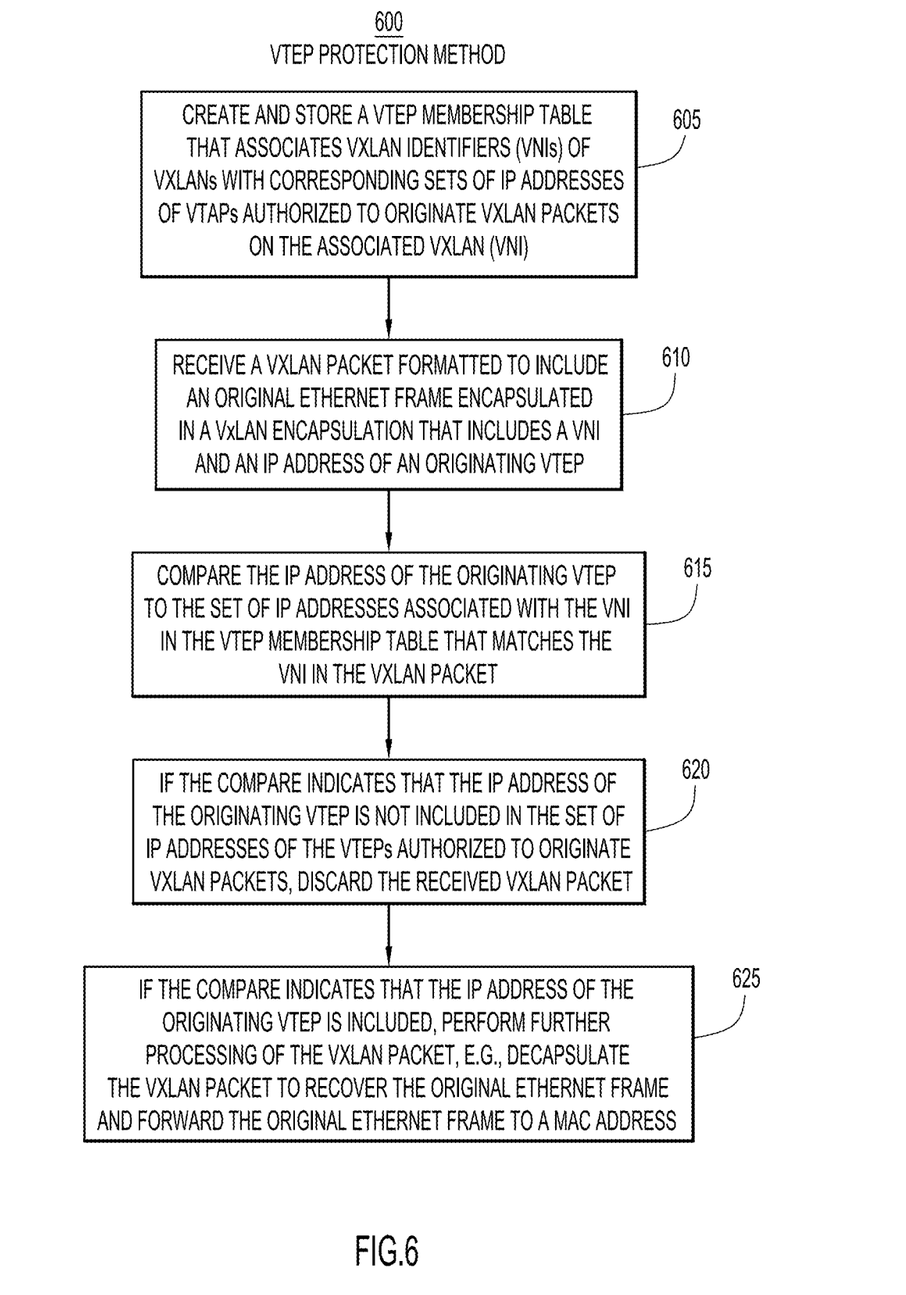
FIG. 6 is a flowchart of an example method of protecting a VTEP against VxLAN packets from invalid/unauthorized VTEPs based on a VxLAN membership table, according to an example embodiment.

With reference to FIG. 6, there is a flowchart of an example method 600 of protecting a VTEP (e.g., any of VTEPs 102) against VxLAN packets from invalid/unauthorized originating VTEPs based on a VxLAN membership table. Method 600 is performed by any of VTEPs 102.

At 605, the VTEP (e.g., VTEP 102(3)) creates a VTEP membership table (e.g., VTEP membership table 504(3)) and stores the table in VTEP memory. The VTEP membership table associates VxLAN identifiers (VNIs) of VxLANs with corresponding sets of IP addresses of VTEPs authorized to originate VxLAN packets on the associated VNI.

At 610, the VTEP receives a VxLAN packet (e.g., valid VxLAN packet 308 from an authorized VTEP or invalid VxLAN packet 404 from an unauthorized source/VTEP) formatted to include an original Ethernet frame encapsulated in a VxLAN encapsulation that includes a VNI and an IP address of an originating VTEP.

At 615, the VTEP compares the IP address of the originating VTEP specified in the received VxLAN packet to the set of authorized VTEP IP addresses associated with the VNI in the VTEP membership table that matches the VNI specified in the received VxLAN packet.

At 620, if the compare indicates that the IP address of the originating VTEP is not included in the set of authorized VTEP IP addresses, the VTEP discards the received VxLAN packet (e.g., as in the case of invalid VxLAN packet 404).

At 625, if the compare indicates that the IP address of the originating VTEP is included in the set of authorized VTEP IP addresses, the VTEP performs further processing of the VxLAN packet (e.g., as in the case of valid VxLAN packet 308). For example, the VTEP decapsulates the VxLAN packet to recover the original Ethernet frame therein and forwards the recovered original Ethernet frame to destination MAC address provided in the Ethernet frame.

Figure 7:
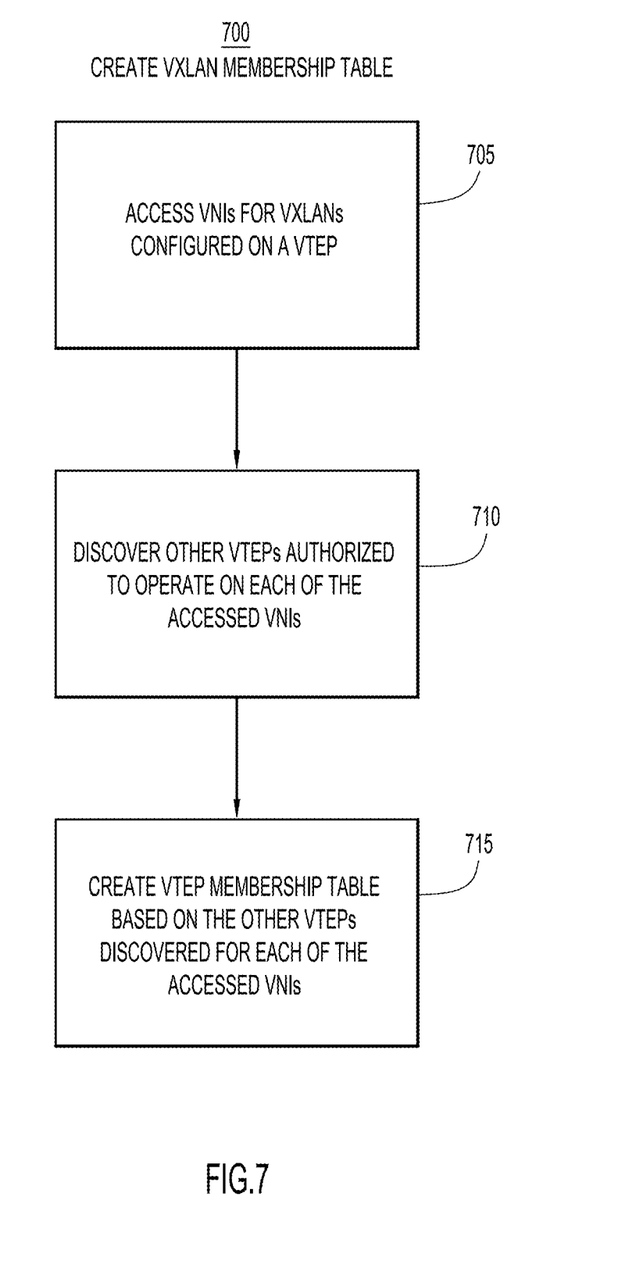
FIG. 7 is a flowchart of an example method of creating a VTEP membership table in a VTEP, according to an example embodiment.

With reference to FIG. 7, there is a flowchart of an example method 700 of creating a VTEP membership table in a given VTEP.

At 705, the VTEP accesses the VNIs for VxLANs in which the VTEP participates (i.e., the VxLANs configured on the VTEP).

At 710, the VTEP discovers, over network 106, other VTEPs authorized to operate on each of the accessed VNIs.

At 715, the VTEP creates the VTEP membership table based on the authorized VTEPs discovered at 710.

Different embodiments of VxLAN use different variations of method 700 to create the VTEP membership table as follows. Multicast based VxLAN without control-plane uses a variation of method 700 that employs multicast messages. IP multicast groups (also referred to as VNI multicast groups) are associated with VxLANs. An IP multicast group associated with a given VxLAN includes the set of VTEPs participating in that VxLAN at a given point in time. The IP multicast group is used as a communication bus between the VTEPs in the group to carry broadcast, multicast, and unknown unicast packets to every VTEP in the group. The use of multicast messages includes sending IP multicast messages including the IP address of the VTEP to the IP multicast group of VTEPs for each VNI, and receiving response messages from the other VTEPs in the IP multicast group (which are deemed authorized VTEPs) for the VNI, and creating the VTEP membership table based on the response messages. VxLAN with Border Gateway Protocol (BGP) control plane uses BGP auto discovery to discover authorized VTEPs for each VNI. VxLAN with a Location Identifier Separation Protocol (LISP) uses Map Server (MS)/ Map Resolver (MR) techniques to discover authorized VTEPs for each VNI.

Figure 8:
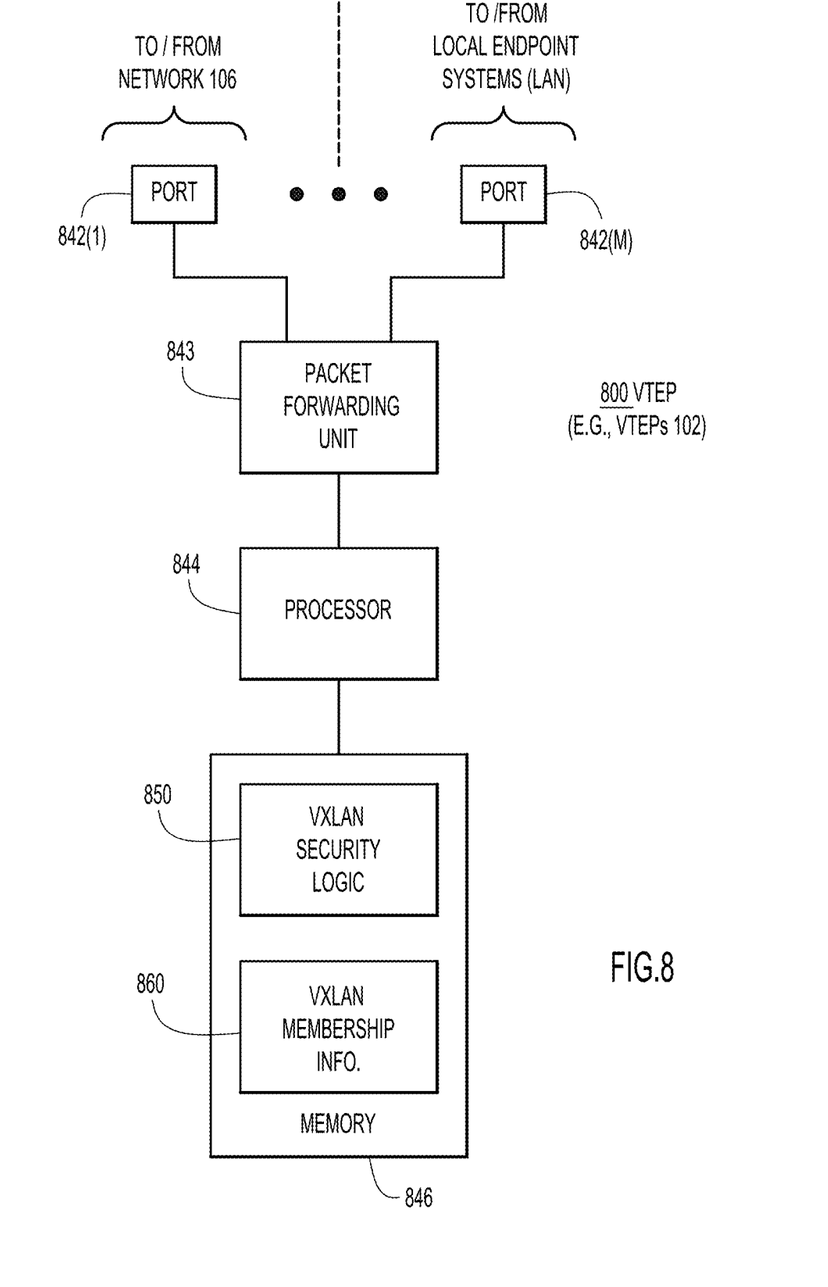
FIG. 8 is an example block diagram of a VTEP configured to perform the method of FIG. 7, according to an example embodiment.

With reference to FIG. 8, there is an example block diagram of a VTEP 800 configured to perform method 600 and other operations described herein. VTEP 800 is representative of any of VTEPs 102. VTEP 800 comprises a plurality of ports 842(1)-842(M), a packet forwarding/processing unit 843, a processor 844, and a memory 846. Some ports among ports 842(1)-842(M) are configured to receive/send packets, such as VxLAN packets, from/to network 106. Other ports among ports 842(1)-842(M) are configured to receive/send packets, such as Ethernet/LAN frames or packets, from/to network endpoint systems local to VTEP 800 (e.g., in a LAN connected to the VTEP). Ports 842(1)-842(M) may include wired and/or wireless ports. The packet forwarding/processing unit 843 is, for example, one or more application specific integrated circuits that include buffers, queues, and other control logic for performing packet forwarding operations. The processor 844 is a microcontroller or microprocessor that is configured to perform higher level controls of the VTEP 800. To this end, the memory 846 stores software instructions that, when executed by the processor 844, cause the processor 844 to perform a variety of operations including operations described herein. For example, the memory 846 stores instructions for VxLAN Security logic 850 to perform method 600 and data for a VxLAN Membership Table 860.

Memory 846 may comprise read only memory (ROM), random access memory (RAM), magnetic disk storage media devices, optical storage media devices, flash memory devices, electrical, optical, or other physical/tangible memory storage devices. Thus, in general, the memory 846 may comprise one or more tangible (e.g., non-transitory) computer readable storage media (e.g., a memory device) encoded with software comprising computer executable instructions and when the software is executed (by the processor 844) it is operable to perform the operations described herein in connection with VxLAN Security logic 850.

In summary, techniques presented herein collect, maintain, and propagate VxLAN membership tables among all authenticated/authorized VTEPs use by each VTEP perform local filtering directed at the source VTEP of each VxLAN data packet received at the VTEP and thereby protect against an attack on the data plane. VxLAN packets from an attacker that contains an unauthenticated source VTEP identifier are dropped, rather than being forwarded into local networks. A BGP discovery protocol may be used to discover authorized VTEPs with which to populate the VxLAN membership tables.

In summary, in one form, a method is provided comprising: at a network device configured as a Virtual Extensible Local Area Network (VxLAN) Tunnel Endpoint (VTEP): storing VTEP membership information that associates VxLANs each with a corresponding set of VTEPs authorized to originate VxLAN packets on that VxLAN; receiving from a communication network a VxLAN packet that identifies a VxLAN and an originating VTEP; comparing the originating VTEP to the set of VTEPs associated with the VxLAN in the VTEP membership information that matches the identified VxLAN; if the comparing indicates that the originating VTEP is not included in the set of VTEPs authorized to originate VxLAN packets, discarding the received VxLAN packet; and if the comparing indicates that the originating VTEP is included in the set of VTEPs authorized to originate VxLAN packets, further processing the VxLAN packet.

In summary, in another form, an apparatus is provided comprising: network ports to send/receive data packets to/from a communication network; a processor coupled to the network ports, and configured to: store Virtual Extensible Local Area Network (VxLAN) Tunnel Endpoint (VTEP) membership information that associates VxLANs each with a corresponding set of VTEPs authorized to originate VxLAN packets on that VxLAN; receive from the communication network a VxLAN packet that identifies a VxLAN and an originating VTEP; compare the originating VTEP to the set of VTEPs associated with the VxLAN in the VTEP membership information that matches the identified VxLAN; if the compare indicates that the originating VTEP is not included in the set of VTEPs authorized to originate VxLAN packets, discard the received VxLAN packet; and if the compare indicates that the originating VTEP is included in the set of VTEPs authorized to originate VxLAN packets, further process the VxLAN packet.

In summary, in yet another form, a computer readable storage media stores instructions that, when executed by a processor of a network device configured as a Virtual Extensible Local Area Network (VxLAN) Tunnel Endpoint (VTEP), cause the processor to: store VTEP membership information that associates VxLANs each with a corresponding set of VTEPs authorized to originate VxLAN packets on that VxLAN; receive from a communication network a VxLAN packet that identifies a VxLAN and an originating VTEP; compare the originating VTEP to the set of VTEPs associated with the VxLAN in the VTEP membership information that matches the identified VxLAN; if the compare indicates that the originating VTEP is not included in the set of VTEPs authorized to originate VxLAN packets, discard the received VxLAN packet; and if the compare indicates that the originating VTEP is included in the set of VTEPs authorized to originate VxLAN packets, further process the VxLAN packet.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
    at a network device configured as a Virtual Extensible Local Area Network (VxLAN) Tunnel Endpoint (VTEP):
        storing VTEP membership information that associates VxLANs each with a corresponding set of VTEPs authorized to originate VxLAN packets on that VxLAN, the VTEP membership information including a VxLAN identifier (VNI) of each VxLAN and an Internet Protocol (IP) address representing a respective source IP address of each VTEP in the corresponding set of VTEPs corresponding to that VNI and that are authorized to originate VxLAN packets;

receiving from a communication network a VxLAN packet that includes an original Ethernet frame encapsulated in a VxLAN encapsulation, the VxLAN encapsulation including a VNI that identifies a VxLAN associated with the VxLAN packet, an outer User Datagram Protocol (UDP) header, an outer IP header including a source IP address of an originating VTEP and a destination IP address, and an optional outer IEEE 802.1Q field;

comparing the source IP address of the originating VTEP to the IP addresses of the set of VTEPs associated with the VNI of the VxLAN in the VTEP membership information that matches the VNI of the VxLAN identified by the VxLAN encapsulation of the received VxLAN packet;

if the comparing indicates that the source IP address of the originating VTEP is not included in the IP addresses of the set of VTEPs authorized to originate VxLAN packets, discarding the received VxLAN packet and blocking flooding of network frames to local endpoint systems on a local area network connected to the VTEP, wherein the discarding results in discarding the VxLAN packet when the VxLAN packet is a malicious VxLAN packet in which the IP source address and the VNI do not match the IP addresses and the corresponding VNIs of the membership information, respectively; and if the comparing indicates that the source IP address of the originating VTEP is included in the IP addresses of the set of VTEPs authorized to originate VxLAN packets, decapsulating the VxLAN packet to recover the original Ethernet frame, and forwarding the recovered original Ethernet frame to a destination Media Access Control (MAC) address specified therein.

2. The method of claim 1, further comprising, at the VTEP, creating the VTEP membership information, the creating including:
accessing VNIs for VxLANs configured on the VTEP;
discovering, over the communication network, other VTEPs authorized to operate on each of the accessed VNIs; and
creating the VTEPs membership information based on the other VTEPs discovered for each of the accessed VNIs.

3. The method of claim 2, wherein the discovering includes, at the VTEP:
sending multicast messages each to a corresponding one of multiple VNI multicast groups configured on the VTEP, each multicast message including an IP address of the VTEP; and
responsive to the sent multicast messages, receiving response messages from the other VTEPs authorized to operate on the VNIs included in the multicast messages.

4. The method of claim 2, wherein the discovering includes, at the VTEP: using Border Gateway Protocol (BGP) auto discovery to discover the other VTEPs.

5. The method of claim 2, wherein the discovering includes, at the VTEP: using Map Server (MS)/Map Resolver (MR) techniques to discover the other VTEPs.

6. The method of claim 1, wherein the storing includes storing the membership information in a table, a list, or a tree structure.

7. An apparatus comprising:
network ports to send/receive data packets to/from a communication network; and
a processor coupled to the network ports, and configured to:
store Virtual Extensible Local Area Network (VxLAN) Tunnel Endpoint (VTEP) membership information that associates VxLANs each with a corresponding set of VTEPs authorized to originate VxLAN packets on that VxLAN, the VTEP membership information including a VxLAN identifier (VNI) of each VxLAN and an Internet Protocol (IP) address representing a respective source IP address of each VTEP in the corresponding set of VTEPs corresponding to that VNI and that are authorized to originate VxLAN packets;
receive from a communication network a VxLAN packet that includes an original Ethernet frame encapsulated in a VxLAN encapsulation, the VxLAN encapsulation including a VNI that identifies a VxLAN associated with the VxLAN packet, an outer User Datagram Protocol (UDP) header, an outer IP header including a source IP address of an originating VTEP and a destination IP address, and an optional outer IEEE 802.1Q field;
compare the source IP address of the originating VTEP to the IP addresses of the set of VTEPs associated with the VNI of the VxLAN in the VTEP membership information that matches the VNI of the VxLAN identified by the VxLAN encapsulation of the received VxLAN packet;
if the compare indicates that the source IP address of the originating VTEP is not included in the IP addresses of the set of VTEPs authorized to originate VxLAN packets, discard the received VxLAN packet and block flooding of network frames to local endpoint systems on a local area network connected to the VTEP, wherein the discard results in discarding the VxLAN packet when the VxLAN packet is a malicious VxLAN packet in which the IP source address and the VNI do not match the IP addresses and the corresponding VNIs of the membership information, respectively; and
if the compare indicates that the source IP address of the originating VTEP is included in the IP addresses of the set of VTEPs authorized to originate VxLAN packets, decapsulate the VxLAN packet to recover the original Ethernet frame, and forward the recovered original Ethernet frame to a destination Media Access Control (MAC) address specified therein.

8. The apparatus of claim 7, wherein the processor further creates the VTEP membership information by:
accessing VNIs for VxLANs configured on the VTEP;
discovering, over the communication network, other VTEPs authorized to operate on each of the accessed VNIs; and
creating the VTEPs membership information based on the other VTEPs discovered for each of the accessed VNIs.

9. The apparatus of claim 8, wherein the processor is configured to discover by, at the VTEP:
sending multicast messages each to a corresponding one of multiple VNI multicast groups configured on the VTEP, each multicast message including an IP address of the VTEP; and responsive to the sent multicast messages, receiving response messages from the other VTEPs authorized to operate on the VNIs included in the multicast messages.

10. The apparatus of claim 8, wherein the processor is configured to discover by, at the VTEP: using Border Gateway Protocol (BGP) auto discovery to discover the other VTEPs.

11. The apparatus of claim 8, wherein the processor is configured to discover by, at the VTEP: using Map Server (MS)/Map Resolver (MR) techniques to discover the other VTEPs.

12. The apparatus of claim 7, wherein the processor is configured to store by storing the membership information in a table, a list, or a tree structure.

13. A non-transitory computer readable storage media encoded with instructions that, when executed by a processor of a network device configured as a Virtual Extensible Local Area Network (VxLAN) Tunnel Endpoint (VTEP), cause the processor to:

store VxLAN VTEP membership information that associates VxLANs each with a corresponding set of VTEPs authorized to originate VxLAN packets on that VxLAN, the VTEP membership information including a VxLAN identifier (VNI) of each VxLAN and an Internet Protocol (IP) address representing a respective source IP address of each VTEP in the corresponding set of VTEPs corresponding to that VNI and that are authorized to originate VxLAN packets;

receive from a communication network a VxLAN packet that includes an original Ethernet frame encapsulated in a VxLAN encapsulation, the VxLAN encapsulation including a VNI that identifies a VxLAN associated with the VxLAN packet, an outer User Datagram Protocol (UDP) header, an outer IP header including a source IP address of an originating VTEP and a destination IP address, and an optional outer IEEE 802.1Q field;

compare the source IP address of the originating VTEP to the IP addresses of the set of VTEPs associated with the VNI of the VxLAN in the VTEP membership information that matches the VNI of the VxLAN identified by the VxLAN encapsulation of the received VxLAN packet;

if the compare indicates that the source IP address of the originating VTEP is not included in the IP addresses of the set of VTEPs authorized to originate VxLAN packets, discard the received VxLAN packet and block flooding of network frames to local endpoint systems on a local area network connected to the VTEP, wherein the discard results in discarding the VxLAN packet when the VxLAN packet is a malicious VxLAN packet in which the IP source address and the VNI do not match the IP addresses and the corresponding VNIs of the membership information, respectively; and if the compare indicates that the source IP address of the originating VTEP is included in the IP addresses of the set of VTEPs authorized to originate VxLAN packets, decapsulate the VxLAN packet to recover the original Ethernet frame, and forward the recovered original Ethernet frame to a destination Media Access Control (MAC) address specified therein.

14. The non-transitory computer readable storage media of claim 13, further comprising instructions to cause the processor to create the VTEP membership information by:
accessing VNIs for VxLANs configured on the VTEP;
discovering, over the communication network, other VTEPs authorized to operate on each of the accessed VNIs; and
creating the VTEPs membership information based on the other VTEPs discovered for each of the accessed VNIs.

15. The non-transitory computer readable storage media of claim 14, wherein the instructions to cause the processor to perform the discovering include instructions to cause the processor to perform, at the VTEP:
sending multicast messages each to a corresponding one of multiple VNI multicast groups configured on the VTEP, each multicast message including an IP address of the VTEP; and
responsive to the sent multicast messages, receiving response messages from the other VTEPs authorized to operate on the VNIs included in the multicast messages.

16. The non-transitory computer readable storage media of claim 14, wherein the instructions to cause the processor to perform the discovering include instructions to cause the processor to perform, at the VTEP: using Border Gateway Protocol (BGP) auto discovery to discover the other VTEPs.

17. The non-transitory computer readable storage media of claim 14, wherein the instructions to cause the processor to perform the discovering include instructions to cause the processor to perform, at the VTEP: using Map Server (MS)/Map Resolver (MR) techniques to discover the other VTEPs.

18. The non-transitory computer readable storage media of claim 13, wherein the instructions to cause the processor to store include instructions to cause the processor to store the membership information in a table, a list, or a tree structure.

* * * * *